United States Patent [19]
Chung et al.

[11] Patent Number: 5,734,160
[45] Date of Patent: Mar. 31, 1998

[54] AUTOMOBILE STEERING ANGLE SENSOR WITH A HUMIDITY MOVING MEMBER AND A SPIRAL SHAPE RESISTANCE BODY

[75] Inventors: Yeon-Goo Chung, Seoul; Dong-Lyong Kim, Inchon; Keon-Sang Kim, Seoul, all of Rep. of Korea

[73] Assignee: KIA Motors Corporation, Seoul, Rep. of Korea

[21] Appl. No.: 664,753

[22] Filed: Jun. 17, 1996

[30] Foreign Application Priority Data

May 17, 1996 [KR] Rep. of Korea .............. 96-16543

[51] Int. Cl.$^6$ .............................................. G01D 5/34
[52] U.S. Cl. .......................... 250/231.13; 250/231.18; 364/424.051
[58] Field of Search ................. 250/231.13, 231.14, 250/231.16, 231.18; 180/170, 400; 364/424.095, 424.096, 424.08, 424.051

[56] References Cited

U.S. PATENT DOCUMENTS 5,253,172  10/1993  Ito et al. ............................ 364/424.5

Primary Examiner—Que Le

[57] ABSTRACT

There is disclosed an automobile steering angle sensor which includes a fixed disk, in which a steering shaft passes through its center, fixed to a column cover, which supports the steering shaft so it can rotate; a rotatable disk, which is mounted facing and at a specified distance from the fixed disk, is fixed to and rotates together with the steering shaft, and has a slot formed in the direction of its radius; a resistance body and common part, which are fixed in a spiral shape making three revolutions on the face of the fixed disk, the width of the resistance body increases at a fixed rate as it spirals along toward the outside; first, second, and third light sensors are mounted on the face of the fixed disk; a humidity moving member inserted in a slot of the rotatable disk, which electronically connects the common part and the resistance body; and slits, formed in the rotatable disk for the light emitted from the first, second, and third light sensors to pass through.

3 Claims, 6 Drawing Sheets

AUTOMOBILE STEERING ANGLE SENSOR WITH A HUMIDITY MOVING MEMBER AND A SPIRAL SHAPE RESISTANCE BODY

BACKGROUND OF THE INVENTION

The present invention relates to an automobile steering angle sensor, and more particularly, to a sensor which measures a steering angle of a steering wheel and is installed in a steering shaft that transmits operational force of the steering wheel to each wheel.

Generally, a steering device allows a driver to freely steer an automobile in the direction he/she pleases, and is comprised of an operational apparatus, a gear unit, and a link apparatus.

The operational apparatus includes a steering wheel, a steering shaft, and a column, and it transmits driving force, when the driver performs a steering operation by turning the steering wheel, to the gear unit and link apparatus. The gear device reduces the rotational speed of the steering shaft and increases the operational force and, at the same time, converts the motional direction of the operational apparatus and transmits it to the link apparatus. The link apparatus transmits the operation of the gear unit to the wheels of the automobile and it supports the placement of each wheel so that they are in line. The link apparatus is comprised of a pittman arm, drag link, knuckle arm, and a tie rod.

If the driver turns the steering wheel, this operational force is transmitted to a Steering gear of the gear unit where it is reduced and its motional direction is converted. Next, the operational force passes through the parts of the link apparatus (the pittman arm, drag link, and knuckle arm) and is transmitted to a knuckle spindle.

Because the knuckle spindle rotates about a king pin, the direction of the automobile's front wheels come to be changed. Also, left/right knuckles are connected to the tie rod through the knuckle arm and are set so as to transmit the movement of one front wheel to the other front wheel.

However, the steering device like that of the above, because road contact resistance of the front wheel is relatively large, there is the drawback that excessive force is needed to operate the steering wheel, and a quick steering operation is not realized.

The above situation is improved through a power steering device which feeds oil pressure, supplied from an oil pump driven by an engine, to a buster installed in the middle of the steering device, and by the operation of the buster, turning of the steering wheel is made easier.

The power steering device includes a power device, an operational device, and a control device. The power device creates oil pressure which becomes the power source, and it is comprised of a oil pump, which is driver by the engine; a pressure control valve, which regulates maximum oil pressure; and a valve unit, which includes an oil capacity control valve that controls oil capacity flowing along an oil passage. The operational device transforms oil pressure created in the oil pump into mechanical force, and makes it so the steering force of the front wheels is generated. The operational device normally uses a double-acting power cylinder. The control device is comprised of a valve, which opens/closes an oil path that reaches the operational device, and an electronic control unit, which controls the opening degree of the valve. The operational direction and state of the power cylinder comes to be controlled by the electronic control device by its transforming of an oil circuit according to the operation of the steering wheel.

The electronic control unit measures a rotated angle of the steering wheel and, according to this steering angle, controls the opening of the valve. As a result, a steering angle sensor for sensing the rotated angle of the steering wheel, that is to say, the rotational angle of the steering shaft must be provided. This steering angle sensor is integrally combined and rotates together with the steering shaft, which transmits the operational force of the steering wheel to each wheel.

The sensor, which is integrally combined and rotates with and measures the steering shaft is divided into two different types: an encoder system, which utilizes light-emitting and light-receiving bodies, and a rotary potentiometer system which can directly calculate steering angle absolute values through resistance values.

The encoder system is comprised of a fixed disk, installed in a column cover which supports the steering wheel, and a rotatable disk, which is mounted opposing the fixed disk and is installed in the steering shaft that is connected to the steering wheel. Three light-emitting and light- receiving bodies are installed in the fixed disk. The first light-emitting body senses the first rotation of the rotatable disk, and the second and third light-emitting bodies sense the steering angle according to the rotational direction of the rotatable disk.

A plurality of slits are formed along the circumference of the rotatable disk for the light emitted from second and third light-emitting bodies to pass to the light-receiving bodies. A single slit is formed to receive the light emitted from the first light-emitting body.

Because of the above structure, light emitted from each light-emitting body goes through the slits at fixed locations on the rotatable disk, which rotates with the steering shaft, and is sensed by the light-receiving bodies. This sensed signal is transmitted to the electronic control unit, and as the steering angle is converted according to this signal in the electronic control unit, the steering angle, according to the rotation angle of the steering shaft, is able to be measured.

This encoder system steering angle sensor, because the rotated location of the rotatable disk according to the rotation of the steering shaft is sensed, that is to say, the steering angle is directly sensed by the light discharged from the second and third light-emitting bodies that passes through the slits and sensed in the light-receiving bodies, is advantageous in that an exact steering angle can be measured.

However, a separate algorithm must be used to convert the signal transmitted from the light-receiving bodies into a steering angle in the electronic control unit. Also, as the steering angle that has been converted in this way becomes a relative angle in the sphere of the steering shaft in its aligned state of 0° to the steering shaft in its left/right maximum rotation angles of −540° and +540°, it is converted again to an absolute value. As a result, steering angle measurement is not realized immediately and has the drawback of being delayed.

A system for correcting this drawback of the encoder system steering angle sensor is the potentiometer system which is able to directly measure the absolute values of the steering angle through resistance values according to voltage, and it is comprised of a fixed disk installed in the column cover which supports the steering wheel, and a rotatable disk installed in and rotating together with the steering axle which is connected to the steering wheel.

A spiral-shaped resistance body is installed in the fixed disk, and in the exterior part of the resistance body and following the spiral shape is installed a common part which is an electronic connecting terminal.

Also, a slot is installed in the radius of the rotatable disk. A humidity moving member capable of movement is inserted in the slot. The humidity moving member, as it rotates with the rotation of the rotatable disk and can move along the slot, moves along the spiral and electronically connects the resistance body and common part and can measure the resistance of the resistance body.

Because of the above structure, if the driver turns the steering wheel, the steering axle and rotatable disk rotate together, and, as a result, the humidity moving member rotates and moves along the slot and comes to move along the spiral, and by the continual connection of the resistance body and common part, the resistance value is measured, and the absolute value of the steering angle according to the resistance value comes to be calculated.

However, in order to rotate the front wheels to ±35°, the steering wheel must by turned to ±540°. Namely, the ratio between the rotation of the steering wheel to the front wheels is roughly 17.5:1. Resulting from this, the steering angle sphere from −540° to +540° is 1080°, and as 1080° is a numerical value 3 times that of 360°, this means that three rotations is needed for complete steering.

As a result, the resistance body is structured making 3 spiral-shaped rotations. That is to say, when the humidity moving member is located at the end terminal of the resistance body at the farthest exterior, this signifies that the steering shaft is completely rotated at 1080°, and the resistance value at this time appears at its highest numerical value.

But the resistance value, as in the following well-known formula, is proportionate to the length of the resistance body and inversely proportionate to the width of the resistance body.

Resistance value $\alpha$ l/w, where l signifies the length of the resistance body and l signifies its width.

The resistance value is calculated by having the length l of the resistance body divided by its width w, then this resulting number is multiplied by the resistance body's own resistance coefficient k.

The prior art method in which the prior art steering angle sensor uses the above formula to calculate the resistance value, the radius $r_3$ of the resistance body's center line from the center of the steering shaft is multiplied by rotated angle of the steering shaft $\Theta$ to find the length l of the resistance body. Here, $r_3$ is the function of $\Theta$, and is calculated by the following test formula.

$$r_3 = (5.1/2\pi)\Theta + 21.7 \qquad 1$$

As the width of the prior art resistance value is fixed and does not change according to the position of rotation, it can be calculated by subtracting the inside radius $r_1$ of the resistance body from the outside radius $r_2$.

That is to say, $r_3\Theta$ is divided by $(r_2-r_1)$, and if this value is multiplied by the resistance coefficient, the resistance value is calculated.

The following is the method of calculation of the above resistance value if it is placed in a sequential order.

$$l = r_3\Theta = \{(5.1/2\pi)\Theta + 21\}\Theta \qquad 2$$

$$w = r_2 - r_1 \qquad 3$$

$$\text{resistance value} = kl/w = \frac{k\{5.1/2\pi)\Theta + 21\}\Theta}{r_2 - r_1} \qquad 4$$

However, in the potentiometer system steering angle sensor, with respect to the calculation of resistance values according to voltage values, as in the above formula 4, the length of the resistance body 1 becomes the second function of $\Theta$, while the width of the resistance body holds a fixed value without relation to rotated location of the steering shaft.

As a result, as resistance values become the second function of $\Theta$, the lateral axis is the axis that obtains rad, and the vertical axis is the axis which shows the resistance value as shown in FIG. 1. The resistance value linearly changes according to the rad and does not stay along the perforated line, and like the solid line showing the second function, it changes non-linearly.

Resulting from this, resistance values measured by the prior art potentiometer system steering angle sensor can not be directly converted into a steering angle absolute value, and the resistance value is substituted in a compensation formula which compensates the non-linear aspect in the electronic control unit. Also, because the absolute value of the steering angle must be calculated, the time for sensing the steering angle is delayed, and because a separate compensation circuit is needed for the electronic control unit and as it must be continually used, this negatively affects memory.

In addition, because the potentiometer system steering angle sensor measures the voltage value between the resistance bodies and common part through the humidity moving element and calculates the absolute values of the steering angle according to the above measurement, a problem arises wherein the measured steering angle is not as accurate as that of using the encoder system because of noise of the voltage applied for measurement of the resistance values.

SUMMARY OF THE INVENTION

The present invention has been made in an effort to solve the above problems.

It is an object of the present invention to provide an automobile steering angle sensor which while integrally utilizing an encoder system and potentiometer system, remedies the drawbacks of each of the systems and, at the same time, adopts the advantages each system has to offer. So, the degree of accuracy in the steering angle measurement value is increased. Also, resistance values are linearly outputted so that they can be instantly converted into a steering angle absolute value by a separate compensating circuit without conversion.

To achieve the above object, the present invention provides an automobile steering angle sensor including:

a fixed disk, in which a steering shaft passes through its center, fixed to a column cover, which supports the steering shaft so it can rotate;

a rotatable disk, which is mounted facing and at a specified distance from the fixed disk, is fixed to and rotates together with the steering shaft, and has a slot formed in the direction of its radius;

a resistance body, which is fixed in a spiral shape making three revolutions on the face of the fixed disk; a common part, which is fixed on the outside of and following the spiral shape of the resistance body; the width of the resistance body increases at a fixed rate as it spirals along toward the outside;

first light sensor for sensing the number of rotations of the rotatable disk, and second and third light sensors for sensing a rotating angle according to a rotating direction of the rotatable disk, are mounted on the face of the fixed disk, and each light sensor has mounted at fixed intervals, light-emitting and light-receiving bodies;

in the slot of the rotatable disk is inserted a humidity moving member, which comes to move in a spiral direction by the rotation of the steering shaft and electronically connects the common part and the resistance body, and a single slit is formed in the rotatable disk for the light emitted from the first light sensor to pass through, and a plurality of slits are formed at regular intervals along the circumference of the rotatable disk for the light emitted from the second and third light sensors to pass through.

Preferably, a width of the resistance body at a particular location is determined using the following formula.

$$w = (0.33/2\pi)\Theta + 1.4$$

Here, w is the width of the resistance body, $\Theta$ is the numerical value of the steering shaft steering angle as a rad.

Also, above and facing the rotatable disk, a guide disk is mounted at a regular interval, fixed to the column cover and having formed a spiral-shaped groove to guide the humidity moving member in a spiral shape.

According to the present invention structured in the above manner, as its steering angle sensor integrally uses both the encoder system and potentiometer system, and, at the same time, is structured so that the width of the resistance body, according the rotated angle of the steering shaft, increases at a fixed rate, the steering angle can be accurately measured, and, according to the angle, the measured resistance value is linearly changed, and the resistance value can be directly converted into an absolute value of the steering angle, without a separate compensating operation.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Preferred embodiments of the present invention will now be described in detail with reference to the accompanying drawings.

Figure 1:
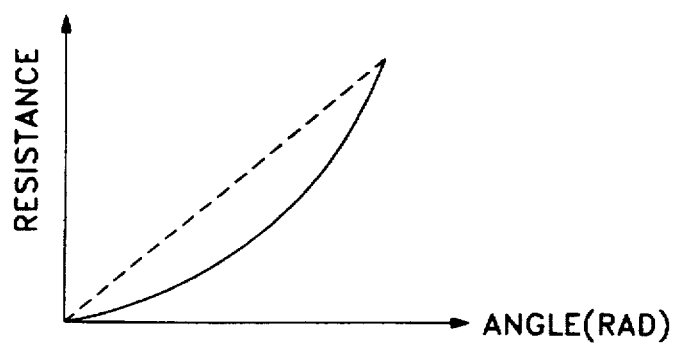
FIG. 1 is a graph showing the relationship between a measured steering angle and resistance values according to the prior art steering angle sensor.
Figure 2:
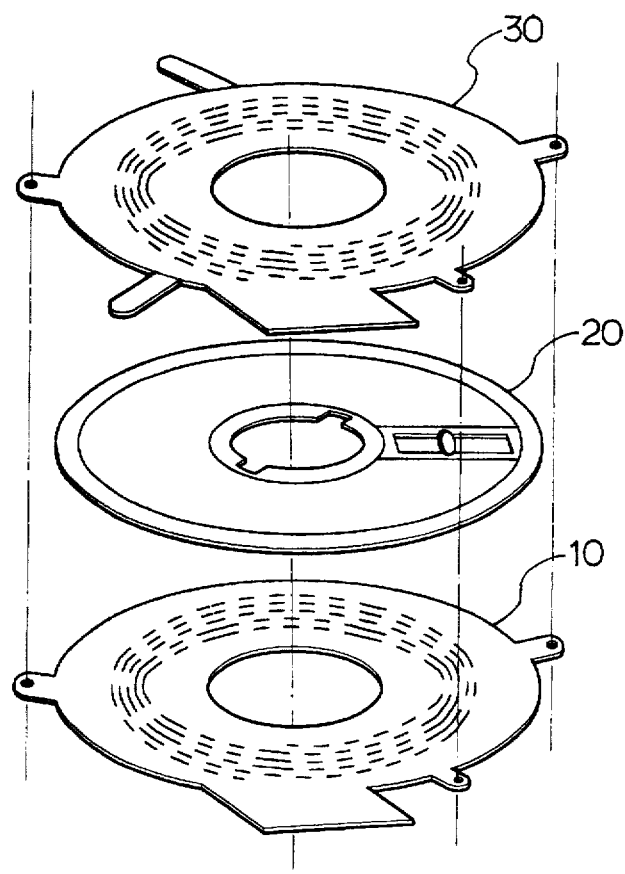
FIG. 2 is an exploded perspective view of a steering angle sensor in accordance with the present invention.

As is illustrated in FIG. 2, a steering angle sensor of the present invention comprises a fixed disk 10, in which a steering shaft 1 passes through its center, that is fixed in a column cover which supports a steering shaft 1 so that it can rotate; a rotatable disk 20, which is mounted above and facing the fixed disk 10, and is fixed and rotates together with steering; and a guide disk 30, which is mounted above and facing the rotatable disk 20, and fixed in the column cover.

Figure 3:
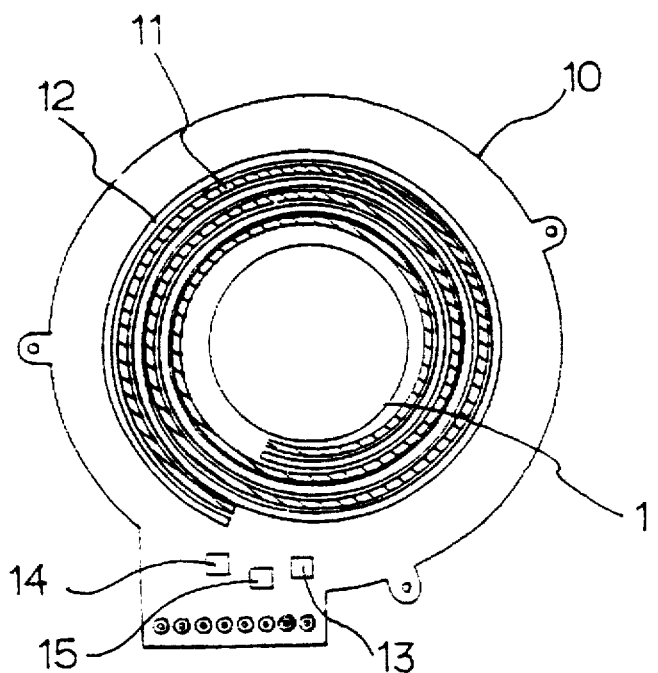
FIG. 3 is a plane view of an essential part of a fixed disk in accordance with the present invention.

In the fixed disk 10, as is illustrated in FIG. 3, a resistance body 11 is installed which is spiral-shaped, and a common part 12 is also installed which is spiral-shaped like the resistance body 11 so as to be enable following the outside of the resistance body 11. Because the total rotation angle of the steering shaft 1 is 1080° (which is three complete revolutions), as detailed in the prior art, the resistance body 11 has a length allowing total rotation angle and is structured making three revolutions in a spiral shape. That is to say, the far inside of the resistance body 11 is at a location of 0° where its resistance value shows its lowest numerical value, and at its farthest exterior, the resistance body 11, where the steering shaft is completely rotated at 1080°, the resistance value shows its highest numerical value.

The resistance body 11 and common part 12, which are means for determining the absolute value of the steering angle by the resistance value through the potentiometer system, and a means for measuring the relative value through the encoder system are all integrally installed in the fixed disk 10. The means measuring relative value are the first, second, and third light sensors 13, 14, and 15, and are installed on the face of the fixed disk 10. They all integrally comprise light-emitting and light-receiving bodies and are mounted at a fixed level. That is to say, the first, second, and third light sensors 13, 14, 15 face the center of the fixed disk, and on their lower sides, light-emitting bodies are mounted, and on their upper sides, light-receiving bodies are mounted (CHECK, p.12). The first light sensor 13 senses the number of rotations of the rotatable disk 20, and the second and third light sensors 14 and 15 sense the rotation angle according to the rotating direction of the rotatable disk 20.

Figure 4:
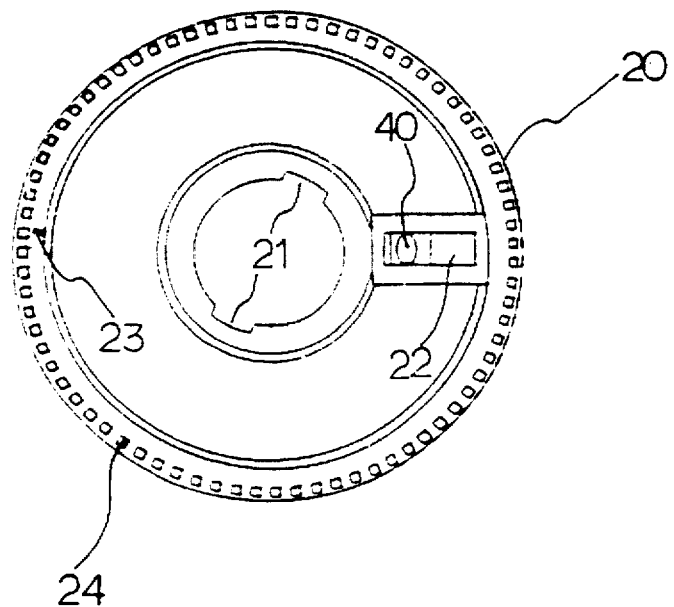
FIG. 4 is a plane view of an essential part of a rotatable disk in accordance with the present invention.
Figure 5:
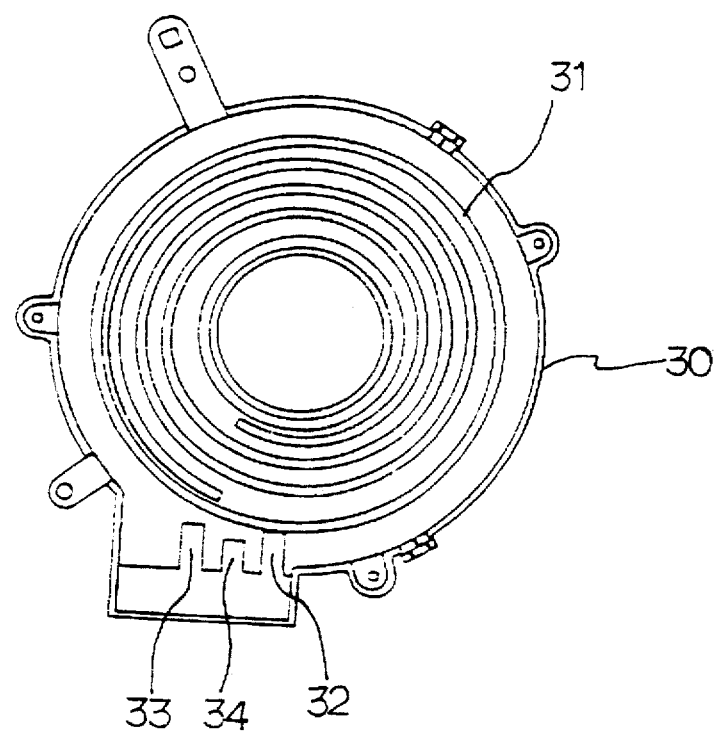
FIG. 5 is a plane view illustrating an essential part of a guide disk in accordance with the present invention.

The rotatable disk 20 which is mounted above and facing the fixed disk, as shown in FIG. 4, has inserted, in the area where the steering shaft passes through, a pair of catch grooves 21, in which a projecting part formed in the steering part at 180° is inserted, and they rotate together with the steering shaft. Following the circumferential line of the rotatable disk 20 are formed a plurality of slits 24 so that the light-receiving bodies can sense the light emitted from the light-emitting bodies of the second and third light sensors 14 and 15. Also, a single slit 23 is formed in the rotatable disk 20 so that the light emitted from the luminous body of the first light sensor 13 can be sensed by the light-receiving bodies.

Each of the slits 23 and 24 must be formed in the exterior of the rotatable disk 20 so that they correspond with each light sensor 13, 14, and 15. As a result, the rotatable disk 20 does not interfere with any of the light sensors 13, 14, and 15, and as it needs to rotate, the rotatable disk 20 has a slightly smaller radius from the steering shaft than the distance to the light sensors 13, 14, and 15.

In addition, a slot 22 is formed in a radial direction in the empty part of the rotatable disk 20, and a humidity moving member 40 is inserted, being able to move, in the slot 22. The humidity moving member 40 rotates by the rotating movement of the rotatable disk 20, and as it can move in a spiral direction along the slot 22, it continuously makes an electronic connection between the resistance body 11 and common part 12, and it can measure the resistance value of the resistance body in a fixed location.

Figure 6:
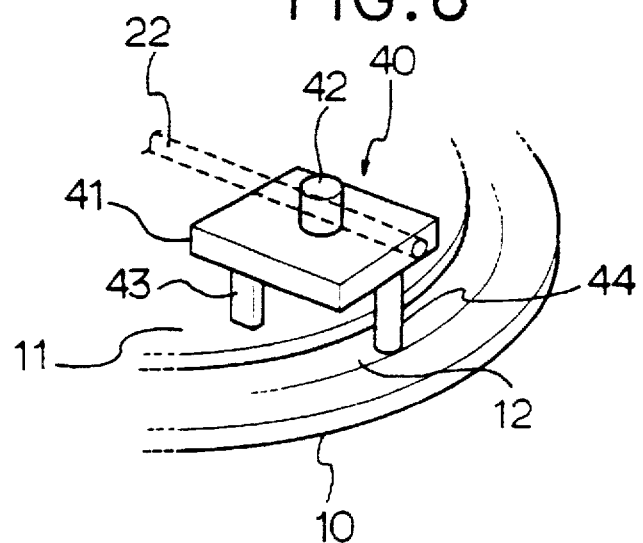
FIG. 6 is a perspective view showing an essential part of a structure of a humidity moving element of a steering angle sensor in accordance with the present invention.

The humidity moving member 40, as is illustrated in FIG. 6, includes a body 41; a slider 42, which is formed in the upper part of the body 41 and moves along the slot 22; and a pair of terminals 43 and 44, which are formed in the lower part of the body 41 and connected to the resistance body 11 and common part 12.

Also, the humidity moving part 40, so as to accurately connect the resistance body 11 and common part 12, as is shown in FIG. 4, a guide disk 30 is formed above and facing the rotatable disk 20. The guide disk 30 has formed, a guide groove 31 which is spiral-shaped identical to that of the resistance body 11.

That is to say, as part of the slider 42 of the humidity moving member 40 protrudes toward the guide home 31, it follows the guide home 31 and comes to move in a spiral shape. Also, groove parts 32, 33, and 34 are formed in the circumference of the guide disk 30 corresponding to the light sensors 13, 14, and 15.

Figure 7:
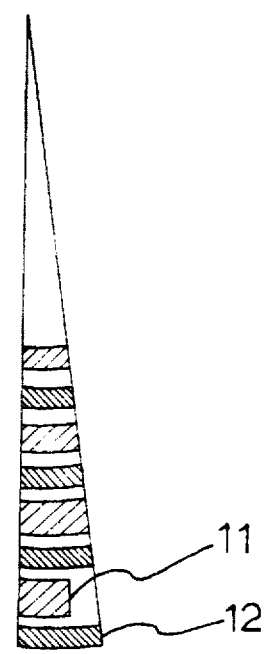
FIG. 7 is a drawing showing an essential part of an arrangement relationship between a resistance body and a common part according to the present invention.

Here, although illustrated in FIG. 3 shown more graphically in FIG. 7, the width of the common part 12 is identical throughout its length, but the width of the resistance body 11 gradually increases at a fixed rate as it moves toward the circumference of the fixed disk 10.

Figure 8:
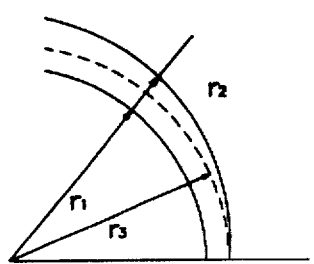
FIG. 8 is a drawing for calculating a formula that determines a width of a resistance body in a steering angle sensor in accordance with the present invention.

The rate of increasing width of the resistance body 11 changes according to the steering angle of the steering wheel, namely, the rotated angle of the steering shaft. That is to say, as is illustrated in FIG. 8, the inside diameter $r_1$ of the resistance body 11 from the steering shaft 1, with $\Theta$, the steering shaft rotation angle, as its function, is calculated using the following formula.

$$r_1 = (4.94/2\pi)\Theta + 21 \qquad 5$$

Also, the outside diameter $r_2$ of the resistance body with $\Theta$ as its function, is calculated using the following formula.

$$r_2 = (5.27/2\pi)\Theta + 22.4 \qquad 6$$

On the other hand, the radius r from the center of the steering shaft 1 to the center of the resistance body 11 can be calculated using the formula 1 from the prior art:

$$r_3 = (5.1/2\pi)\Theta + 21.7.$$

Figure 9:
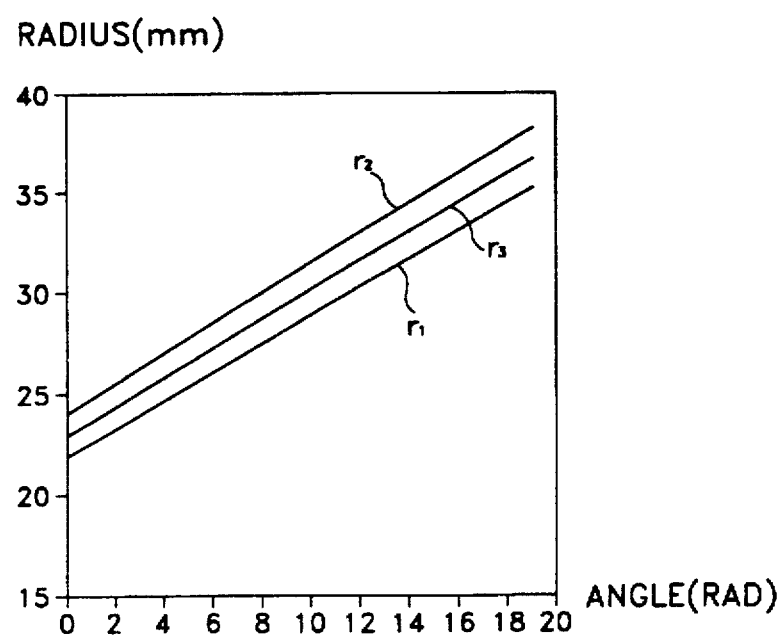
FIG. 9 is a graph showing a change of a inner radius, outer radius and center line of a resistance body according to a steering angle.
Figure 10:
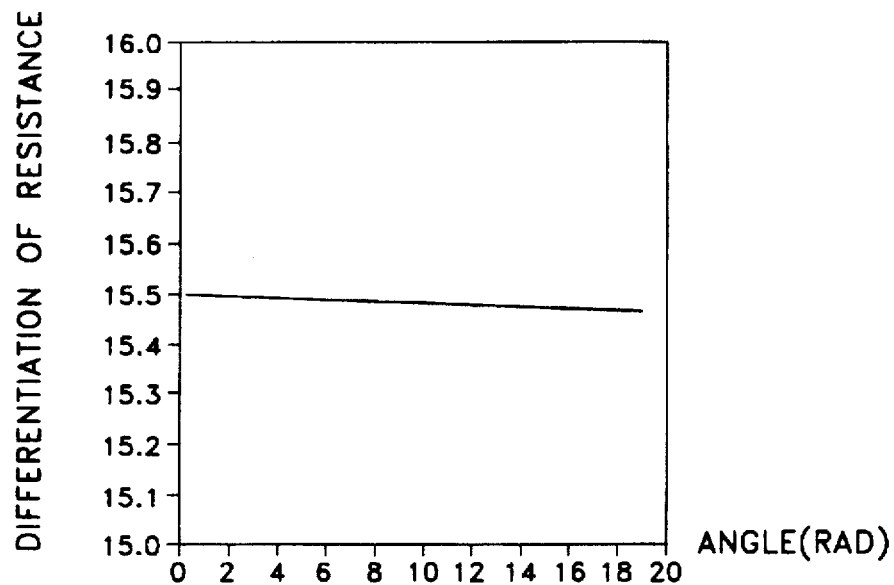
FIG. 10 is a graph illustrating a change rate of resistance values according to a steering angle.

That is to say, $r_1$, $r_2$, and $r_3$, as is shown in the graph illustrating red, which is transverse axis, and radius (mm) of FIG. 9, increase at a fixed rate.

The following is the finding of the width and resistance value of the resistance body 11 using formulas 1, 5, and 6.

First, the length of the resistance body 11 is calculated using formula 2 of the prior art:

$$l = r_3\Theta = \{(5.1/2\pi)\Theta + 21)\}\Theta$$

The width w of the resistance body 11 is found by subtracting the inside diameter $r_1$ from the outside diameter $r_2$. The following is its formula.

$$\begin{aligned} w &= (r_2 - r_1) \\ &= \{(5.27/2\pi)\Theta + 22.4\} - \{(4.94/2\pi)\Theta + 21\} \\ &= (0.33/2\pi)\Theta + 1.4 \end{aligned} \qquad 7$$

The resistance value is found by multiplying the length l of the resistance body 11 to the essential resistance coefficient of the resistance body 11, and this is divided by the width w of the resistance body 11.

The following is the formula.

$$\text{resistance value} = k^{\frac{l}{w}} \qquad 8$$

$$= k^{\frac{\{(5.1/2\pi)\Theta + 21.7\}\Theta}{(0.33/2\pi)\Theta + 1.4}}$$

As a result, as in formula 8, as the denominator is second function of $\Theta$, and the numerator is the first function of $\Theta$, if the numerator formula is divided by the denominator formula, the resistance value becomes the first function of $\Theta$.

As in the above, as the resistance value becomes the first function of $\Theta$, it does not change with respect to angle and it stays at a value of roughly 15.5.

Figure 11:
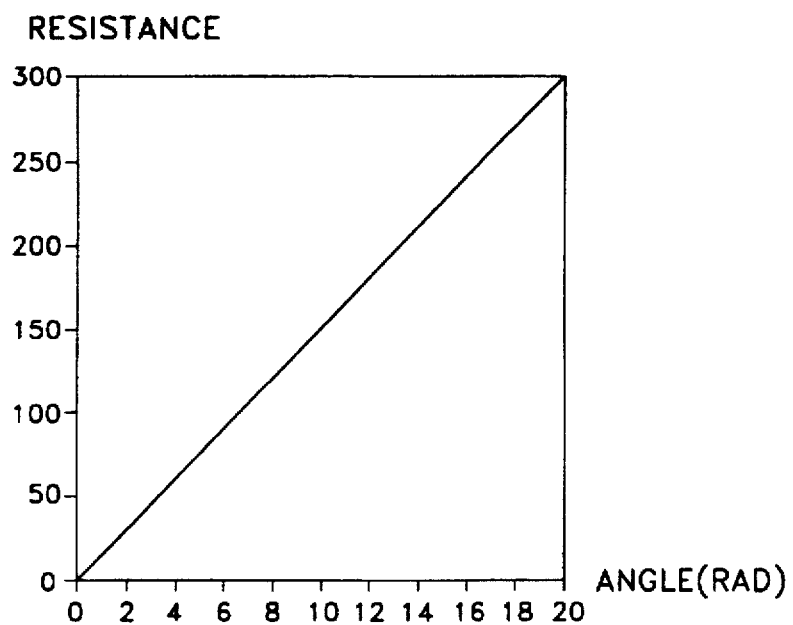
FIG. 11 is a graph showing a linear change of resistance values with reference to a steering angle measured by a steering angle sensor.

As a result, transverse axis is an axis where the rad of steering shaft appears, and longitudinal axis is an axis where the resistance value appears, and, as shown in FIG. 11, resistance value changes linearly with respect to the steering angle.

The following is detailed explanation of the operation of the present invention with the above structure.

If the steering shaft 1 rotates, as the rotatable disk 20 comes to rotate, the humidity moving element 40, which is supported by the guide home 31, follows the slot 22 and it moves following a spiral shape. The terminals 43 and 44 connect the resistance body 11 and common part 12 and the resistance value gets continuously measured. The resistance value, which has been measured in this way, is directly converted into an absolute value of the steering angle, without use of a separate compensation algorithm.

However, as noise normally develops from the electric current applied to the humidity moving element 40, the resistance value can not be precisely measured as a result of this noise, and because there are times when a slight error occurs, an encoder system is performed simultaneously to measure steering angle.

So, according to the rotating direction of the rotatable disk 20, light emitted from the light-emitting body of either the second or third light sensor 14 and 15 is transmitted to a light-receiving body through one of the slits 24, and an encoder signal is created. This encoder signal, and at the same time, light emitted from the first light sensor 13 passes through the slit 23, and by a signal of whether they were transmitted, the relative angle of the steering angle is measured, and it is converted to an absolute value by a compensating algorithm. The relative angle of the steering angle, measured by the encoder system, as there are no factors to reduce the accuracy of measurement, it is most precise. As a result, mis-operation of the potentiometer system is checked and controlled.

Also, there is the prevention of mis-operation caused by damage to the slits 23 and 24 and other mechanical instruments of the encoder system, and initial values for the measurement of relative angle are established by the use of the potentiometer system. As the encoder system and potentiometer system mutually offset any deficiencies and compliment each other, an exact steering angle can be measured.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An automobile steering angle sensor comprising:
   a fixed disk, in which a steering shaft passes through its center, fixed to a column cover, which supports the steering shaft so it can rotate;
   a rotatable disk, which is mounted facing and at a specified distance from the fixed disk, is fixed to and rotates together with the steering shaft, and has a slot formed in the direction of its radius;
   a resistance body, which is fixed in a spiral shape making three revolutions on the face of the fixed disk, the width of the resistance body increases at a fixed rate as it spirals along toward the outside;
   a common part, which is fixed on the outside of and following the spiral shape of the resistance body;
   a first light sensor for sensing the number of rotations of the rotatable disk;
   second and third light sensors for sensing a rotating angle according to a rotating direction of the rotatable disk, which are mounted on the face of the fixed disk;
   light-emitting and light-receiving bodies mounted at fixed intervals on each light sensor;
   a humidity moving member inserted in the slot of the rotatable disk, which comes to move in a spiral direction by the rotation of the steering shaft and electronically connects the common part and the resistance body;
   a single slit, formed in the rotatable disk for the light emitted from the first light sensor to pass through;
   a plurality of slits formed at regular intervals along the circumference of the rotatable disk for the light emitted from the second and third light sensors to pass through.

2. The automobile steering angle sensor of claim 1, wherein a width of the resistance body at a particular location is determined using the following formula:

$$w = (0.33/2\pi)\Theta + 1.4$$

Here, w is the width of the resistance body, $\Theta$ is the numerical value of the steering shaft steering angle as a rad.

3. The automobile steering angle sensor of claim 1, wherein a guide disk is mounted at a regular interval above and facing the rotatable disk, fixed to the column cover and having formed a spiral-shaped groove to guide the humidity moving member in a spiral shape.

* * * * *